United States Patent [19]

Grinberg et al.

[11] Patent Number: 4,937,539

[45] Date of Patent: Jun. 26, 1990

[54] PHASED ARRAY FOR OPTICAL BEAM CONTROL

[75] Inventors: Jan Grinberg, Los Angeles; Thomas R. O'Meara, Malibu; Yuri Owechko, Newbury Park; Melvin E. Pedinoff, Thousand Oaks; Bernard H. Soffer, Pacific Palisades, all of Calif.

[73] Assignee: Hughes Aircraft Company, Los Angeles, Calif.

[21] Appl. No.: 420,661

[22] Filed: Oct. 10, 1989

Related U.S. Application Data

[63] Continuation of Ser. No. 87,173, Aug. 19, 1987, abandoned.

[51] Int. Cl.$^5$ .................. G02F 1/133; G02F 1/137
[52] U.S. Cl. ............................. 330/4.3; 350/347 E; 350/348
[58] Field of Search .................................. 332/7.51; 350/6.11–6.91, 347 E, 348, 162.22; 455/615

[56] References Cited

U.S. PATENT DOCUMENTS

| | | | |
|---|---|---|---|
| 3,787,111 | 1/1974 | Giordmaine et al. | 350/160 |
| 3,824,002 | 7/1974 | Beard . | |
| 3,843,231 | 10/1974 | Borel et al. | 350/348 |
| 3,988,055 | 10/1976 | McNaney | 350/162.22 |
| 4,190,330 | 2/1980 | Berreman . | |
| 4,300,818 | 11/1981 | Schachar . | |
| 4,351,589 | 9/1982 | Chavel et al. . | |
| 4,373,218 | 2/1983 | Schachar . | |
| 4,385,799 | 5/1983 | Soref . | |
| 4,389,096 | 6/1983 | Hori et al. . | |
| 4,408,836 | 10/1983 | Kihaino | 350/334 |
| 4,493,531 | 1/1985 | Bohmer et al. | 350/336 |
| 4,516,837 | 5/1985 | Soref et al. . | |
| 4,543,662 | 9/1985 | Huignard et al. . | |
| 4,626,069 | 12/1986 | Dammann et al. . | |
| 4,639,091 | 1/1987 | Huignard et al. | 350/347 V |
| 4,661,786 | 4/1987 | Bender | 332/7.51 |
| 4,662,746 | 5/1987 | Hornbeck | 332/7.51 |
| 4,698,602 | 10/1987 | Armitage | 332/7.51 |
| 4,710,732 | 12/1987 | Hornbeck | 332/7.51 |

FOREIGN PATENT DOCUMENTS

| | | |
|---|---|---|
| 0051394 | 5/1982 | European Pat. Off. . |
| 0074144 | 3/1983 | European Pat. Off. . |
| 2254057 | 7/1975 | France . |
| 0215626 | 12/1983 | Japan . |

OTHER PUBLICATIONS

B. H. Soffer et al, "Variable Grating Mode Liquid Crystal Device for Optical Processing", SPIE, vol 218, Devices and Systems for Optical Signal Processing, pp. 81–86, 1980).

(List continued on next page.)

*Primary Examiner*—Nelson Moskowitz
*Attorney, Agent, or Firm*—V. D. Duraiswamy; P. M. Coble; W. K. Denson-Low

[57] ABSTRACT

An optical beam scanner incorporating an array of beam deflection elements commonly controlled to steer an optical beam impingent on the array is described. The beam steering elements are arranged in the array as individually controlled elements and the deflection of the beam is accomplished by setting the phase tilt and the phase offset of each element according to a calculation which removes modulo $2\pi$ phase shift from the required position relative to a flat plane. Thus, the array elements can be thin and need only supply about 2 radians of phase shift. These elements may be incorporated in a planar array using beam deflection elements such as liquid crystal beam deflectors by choosing a drive scheme representing either a blazed array or a flat piston array. Operation may be designed for a large range of light wavelengths and the system may efficiently accommodate a combination of the blazed and flat piston techniques to obtain beam deflection characteristics otherwise unavailable by the exclusive use of each individual technique. By use of the liquid crystal phased array approach, rapid, high accuracy, large area beam deflection is possible without the necessity of any moving parts and with low power drive requirements. Phased arrays of the type described above may be arranged in successive parallel planes with a common beam axis to provide two-dimensional beam deflection.

10 Claims, 12 Drawing Sheets

OTHER PUBLICATIONS

U. Killat et al "Binary Phase Gratings for Couplers Used in Fiber-Optic Communications, Fiber and Integrated Optics", vol. 3, Nos. 2-3, pp. 221-235, 1980.

U. Killat et al, "Binary Phase Gratings for Star Couplers with High Splitting Ratio", Fiber and Integrated Optics, vol. 4, No. 2, pp. 159-167, 1982.

Yoshizazu et al., "Field-Controllable Liquid-Crystal Phase Grating", IEEE Transaction on Electron Devices, vol. ED-26, No. 11, Nov. 1979, pp. 1734-1737.

Ludeman et al; "Liquid-Crystal Cell . . . Thickness"; IBM Tech. Disc. Bull., vol. 15, #4, 9/72.

Nikulin et al; "An Electrooptic Crystal . . . Deflection"; Radio Engin. & Electron. Phys., vol. 19, #8, pp. 157-159, 1974.

Sasaki et al; "Liquid-Crystal Light Deflector"; 5/10/79, Elect. Lett., vol. 15 #10, pp. 293-294.

Bleha et al; "Optical Data . . . Light Value"; 8/30/79; Proc. Soc. Photo-Opt. Instrum. Eng. (U.S.A.) San Diego, Ca.; Abst. only.

Liu et al; "General Two-. . . Interdigital Transducer"; 11/19/86; IEEE, pp. 129-132, vol. 1.; Inst. of Acoust.; Abst. only.

M. A. Muriel and J. A. Martin-Pereda, "Digital Light Beam Deflector With Liquid Crystals," 1980 European Conference on Optical Systems and Applications (Utrecht) SPIE, vol. 236, pp. 386-388; and Abstract Analog Light Beam Deflector with Liquid Crystals, OSA vol. 70, No. 12, Oct. 1980.

D. J. Channin and D. E. Carlson, "Rapid Turn-Off in Triode Optical Gate Liquid Crystal Devices," Applied Physics Letters, vol. 28, No. 6, Mar. 15, 1976, pp. 300-302.

D. J. Channin, "Triode Optical Gate: A New Liquid Crystal Electro-Optic Device", Applied Physics Letters, vol. 26, No. 11, Jun. 1, '75, pp. 603-605.

A. E. Fray, "Large-Angle Beam Deflector Using Liquid Crystals," Elec. Letters, Aug. 7, '75, vol. 11, No. 16, p. 359.

G. L. Tangonan, "Variable-Grating-Mode Liquid Crystals for Fibre-Optic Applications," Electronics Letters, vol. 21, Aug. 1985, pp. 701, 702.

Susumu Sato, "Liquid-Crystal Lens-Cells with Variable Focal Length", Japanese Journal of Applied Physics, vol. 18, No. 9, Sep. 1979, pp. 1679-1684.

B. H. Soffer, D. Boswell, A. M. Lackner, "Optical Computing with Variable Grating Mode Liquid Crystal Devices," SPIE vol. 232, 1980 International Optical Computing Conference (1980), pp. 128 to 136.

M. A. Muriel et al, "Magneto-Optical Deflector with Nematic Liquid Crystals," Proceedings of the Technical Program, Electro-Optics/Laser 80 Conference and Exposition, Boston, MA, Nov. 19-21, 1980, pp 199-201.

Yuichi Ninomiya, "Ultrahigh Resolving Electrooptic Prism Array Light-Deflectors", IEE Journal of Quatum Electronic, vol. QE-9, No. 8, Aug. 1973, pp. 791-795.

M. A. Muriel et al., Abstract titled "Analog Beam Deflector with Liquid Crystals", Journal of the Optical Society of America, Dec. 1980, vol. 70, No. 12, p. 1610.

M. A. Muriel et al., "Digital Light Beam Deflector with Liquid Crystals," Euro-physics Conference Abstracts, 12, 1980 European Conference on Optical Systems & Applications, Utrecht (The Netherlands), Sep. 23-25 1980, vol. 41.

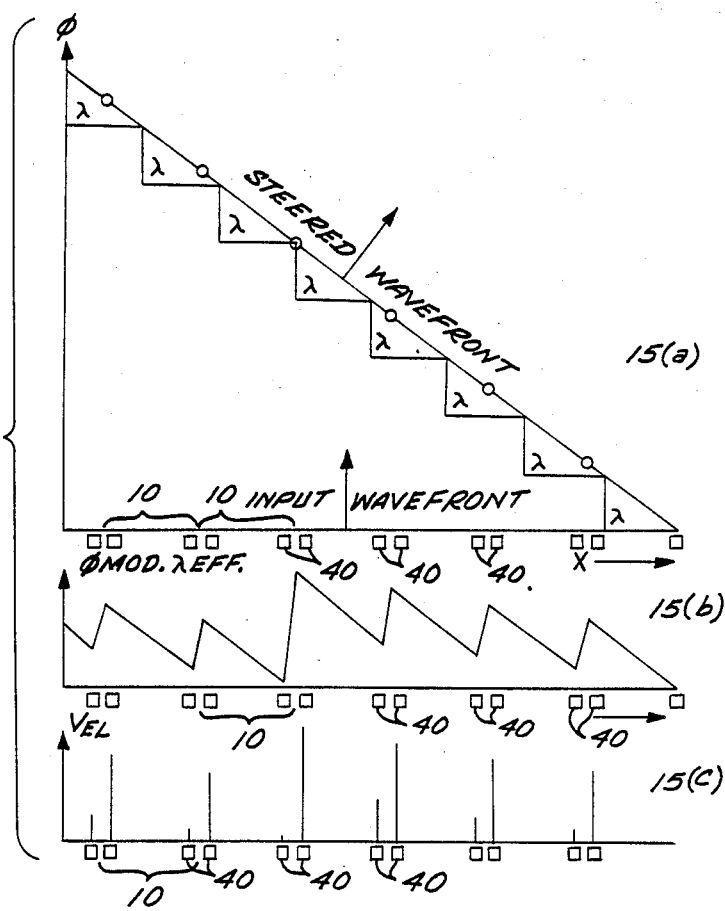
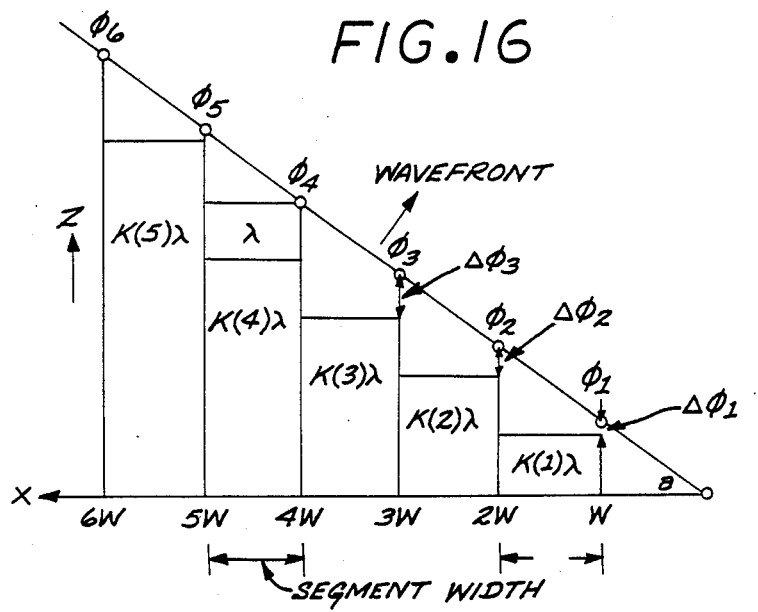

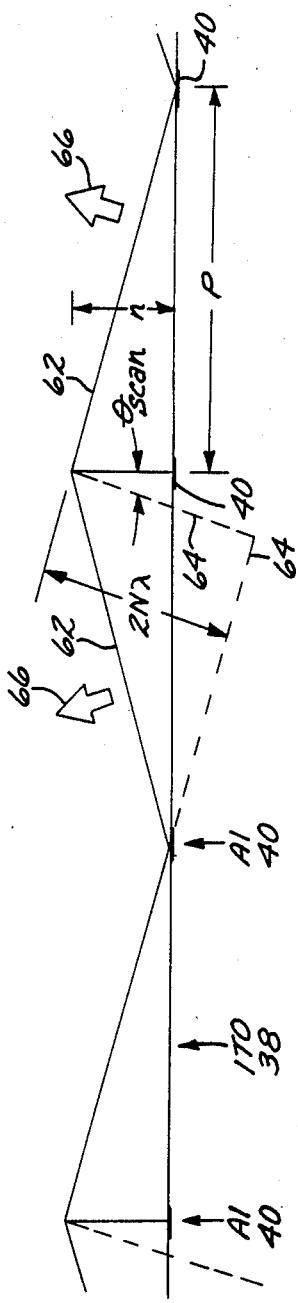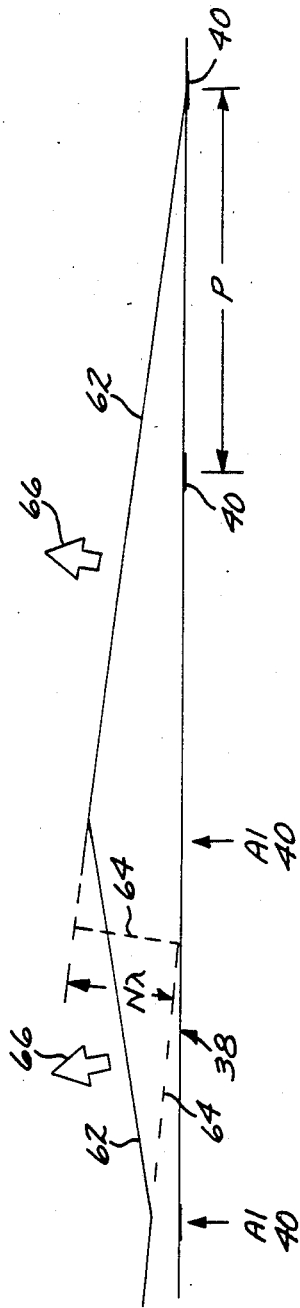
FIG.19A
FIG.19B

PHASED ARRAY FOR OPTICAL BEAM CONTROL

This application is a continuation of application Ser. No. 87,173, filed Aug. 19, 1987, now abandoned.

FIELD OF THE INVENTION

This invention relates to the field of optical beam steering and more particularly to a system and method for rapidly altering the angle of deflection of an optical beam impingent upon an array of beam deflection devices.

BACKGROUND OF THE INVENTION

The steering of optical beams has assumed increased importance as the use of such beams for communications and weaponry has proliferated. Conventional methods of steering optical beams include movable reflectors or refractors and electro-mechanical steering of arrays of deflectors, each of which steers a portion of the beam in parallel with the other deflectors in the array. Such beam steering techniques have become more important as various applications involving requirements for high phase coherence and accuracy of pointing have emerged. In particular, the propagation of collimated beams of light such as laser light over long distances require that such a collimated beam be of a relatively large diameter, retain phase coherence, provide for very low scattering of light in the deflection process, and be aimed with very high accuracy These requirements are difficult to obtain with prior art techniques when high angular deflection rates are required of the beam steering apparatus. Those techniques are particulary inadequate when large diameter beams exceeding approximately 20 cm in diameter must be steered.

The use of conventional mechanical techniques requires that such beam steering devices have a low moment of inertia and impose minimum distortion while being rapidly pointed. In the past, approaches to accomplishing optical beam steering have included relatively large single reflectors and arrays of smaller reflectors or refractors. However, there are serious problems with these approaches. Phased arrays with many moving parts are complex and expensive to construct, are limited in the angular excursion they can accommodate and are relatively difficult to calibrate and synchronize with one another. Large reflectors may be constructed with large diameters and highly accurate surfaces to retain phase coherence and thus provide a collimated beam. However, such reflectors have relatively high moments of inertia and therefore, large drive power requirements when rapid beam steering is required. Any attempt to reduce the weight and inertia of such a system is likely to result in distortion being induced when the accelerations associated with rapid angular beam movement occur. Some approaches using liquid crystal arrays have been proposed for spatial intensity to position mapping, but such systems have been primarily related to phase conjugation and other intensity modification applications. The use of conventional electro-optic scanners is similarly restricted, since large diameter crystals are not available. Furthermore, very high voltages are required to generate the phase shifts with such scanners and the available scan angles are restricted.

From the above, it is clear that modern systems employing lasers for communications and weapons have created an as yet unfulfilled need for agile beam deflectors that retain spatial phase coherence and surface accuracy over large apertures and are capable of propagating light beams over great distances with minimal scattering and energy loss due to phase interference.

SUMMARY OF THE INVENTION

The present invention provides an agile optical beam steering device that contains no moving parts and is amenable to a construction which can accommodate a relatively large diameter beam, may be rapidly pointed through relatively large angles and maintains high phase coherence and low beam scattering throughout a large beam steering angle. Futhermore, the beam steering apparatus of the present invention is relatively simple to manufacture and incorporate into optical systems and is easily controlled by relatively simple electronic and computer control systems which may be integrated with other peripheral systems.

The apparatus of the present invention utilizes an array of beam deflecting elements that steer an optical beam impingent upon the array to an angle referenced to the incoming beam and determined by an electrical signal applied to the array elements. The array element may be either transmissive or reflective, depending upon the geometry of the incoming and reflected beam and maintains phase coherence by periodic resets of the array elements, modulo $2\pi$ to avoid the necessity of modulating the array element offset phases over more than a limited number of multiples of $2\pi$ phase. Thus, the optical phased array of the present invention can accommodate large scan angles with minimal phase shifts in individual elements and with interelement offset phases which are generally smaller than $2\pi$ radians.

The array of the present invention thus consists of a plane of linear array elements, each of which is capable of introducing a phase shift in the portion of the light beam impingent upon it which is sufficent to diffract the outgoing wavefront through an angle which, when coordinated with adjacent elements, is sufficient to cause a deflection of the total beam through a desired angle. By the use of occasional modulo $2\pi$ interelement perturbations from the linear progressive phase shifts normally required of the array, one may reduce the required thickness of the liquid crystal cells producing the progressive phase shift and thereby reduce the time required to achieve a given change in angular beam deflection. Further, the array elements need not create diffraction losses which are substantially greater than the ideal linear phase shift beam deflector.

In one preferred embodiment of the invention, hereinafter referred to as the "BLAZED PHASED ARRAY", liquid crystal beam deflectors may be used as array elements, either in a reflective or transmissive mode. The effective liquid crystal birefringence for such beam deflection elements is a function of the voltage applied across the liquid crystal and varies approximately linearly across the crystal with the applied voltage. Two such liquid crystal layers may be used to provide a two dimensionally steered beam in both azimuth and elevation, relative to the common axis of the arrays.

Since the refractive index of the element may be varied across the element by the voltage applied across the conductive interface between the two electrodes bonding the element, such an array is similiar to the "Blazed" diffraction gratings known in the optical arts in which the grating lines are angled relative to the surface of the grating to produce a more efficient beam deflection to a desired angle.

In another preferred embodiment, e.g., for use in systems which demand the maximum speed of response, a design incorporating a flat array equivalent to the "piston element" adaptive optics phase conjugate systems known in the art may be used. In such an array a single voltage is applied to each element and there is therefore a single refractive index applied to the portion of the beam inpingent upon each of the array elements. The primary disadvantage associated with the piston element approach is the relatively smaller angle through which a beam impingent upon an array of these elements may be steered because of the lower intrinsic efficiency of such a flat phase grating approach at larger deflection angles. However, when light beams are to be deflected at maximum speed, the flat array is superior to the blazed array incorporation, since a thinner liquid crystal cell is required in this approach, and a thinner cell responds faster.

A liquid crystal beam deflector element of the type incorporated in the present invention may be found in an array of such beam elements, incorporating strips of liquid crystal deflectors that are arranged parallel to one another. The strips can contain a series of electrodes that allow the various portions of the strip to introduce controllable phase shifts into a light beam. These portions of the liquid crystal strip may be individually addressed in such a manner that the resultant refraction index of the strip produces the desired phase shift and is proportional to the voltage applied across the electrodes. Such arrays of elements may be overlayed to provide the required phase shifts with thinner cells, thereby improving the speed of response, degrees of refractivity and the ability to steer through angles of azimuth and elevation via simultaneous inputs to the layers of elements required for those angles.

From the above it is clear that the optical phased array beam steering apparatus and concept of the present invention provides a rapid and accurate means to steer a large optical beam through relatively large angles while maintaining phase coherence and high optical quality in the steered beam. Other features and advantages of the invention will become apparent from the following detailed description, taken in conjunction with the accompanying drawings which illustrate, by way of example, the features of the invention.

BRIEF DESCRIPTION OF THE DRAWINGS

FIG. 15a is a representation of the steered wavefront as a function of the input wavefront for an ideal steering mirror.

FIG. 15b is a representation of the phase for the elements of a blazed phase array with modulo $2\pi$ wavelengths subtracted from the wavefront of 15a.

FIG. 15c is a representation of the voltage applied to the electrode of each liquid crystal cell to produce the phase shifts of FIG. 15b.

FIG. 16 is an illustration of the phase relationships of a blazed phased array of the present invention used to calculate the phase shift required for each element.

FIG. 19a is a simplified schematic illustration of the deflection relationships at the maximum scan angle for a blazed hybrid scanning element.

FIG. 19b is an illustration of the relationship of the output ray paths for an intermediate scan angle for a blazed hybrid scanner.

DETAILED DESCRIPTION

Figure 1:
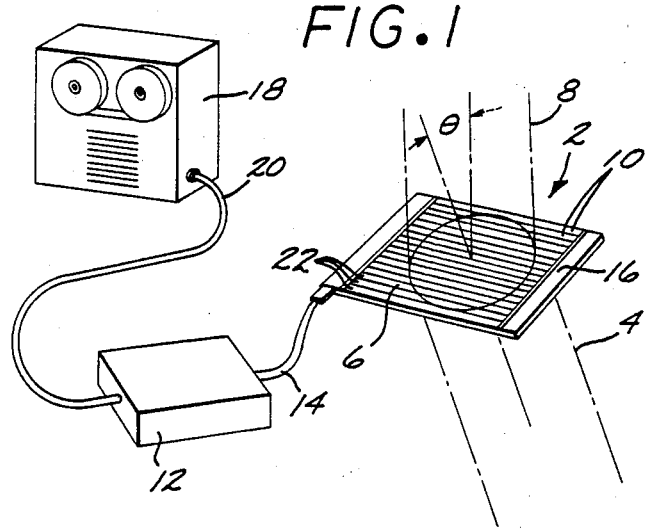
FIG. 1 is a perspective schematic diagram of the major components of the invention.

As shown in the exemplary drawings, the invention is embodied in an array of linear optical elements 2 that serve to deflect a light beam 4 impingent upon the surface of the array 6 through an angle $\theta$ relative to the input beam 4 to produce an output beam 8. The deflection angle of the beam may be steered by the control of individual optical elements 10 coordinated by a remote control system 12 connected to the array 2 by cabling 14 connected to control electronics and logic 16 located adjacent to array elements 10. A computer 18 may be used to provide programmed control input to control system 12 by cable 20. Optical elements 10 are of the type that cause the deflection of an optical beam through an angle approximately proportional to the input voltage applied to the element.

The deflection of optical beams of relatively large diameter and high energy is an important technological element in modern high power laser communications and weapon systems. Conventional means of deflecting or steering such beams rely upon electro-mechanical elements which are limited in their ability to rapidly steer through large angles in the case of large single reflectors or, in the case of small electro-mechanical subreflectors, are limited due to the complexity and mechanical and electronic difficulties associated with fabrication of large arrays. Furthermore, the large moments of inertia associated with large electro-mechanical reflectors and telescopes substantially limit their ability to respond to requirements for large steering angles and rapid response times. The present invention avoids these problems and provides a solution to the problem of maintaining high phase coherence and low scattering for a beam steering apparatus capable of rapidly steering a large diameter light beam through a relatively large angle.

More particularly, and by way of example, the present invention is embodied in a phased array 2 of liquid crystal beam deflector elements 10 that display a variable index as a function of the voltage applied to the individual liquid crystal cell. The linear cells 10 of the present invention may be stacked to create a two dimensional array of elements 2 with each cell under coordinated control to produce a desired deflection angle. By commanding the appropriate voltages for a desired deflection angle to successive rows of the array, a wavefront with good spatial phase coherence can be imposed on the incoming beam. The stacking of two such arrays along the axis of the input beam with the rows of cells orthogonal to one another can produce a beam steering apparatus that allows steering of the beam in both azimuth and elevation relative to the input beam. Since hundreds to thousands of electrodes are typically required, the beam steering array may be advantageously fabricated into a single unit which incorporates control electronics on the periphery of the array that may be controlled by relatively simple, low voltage, signals from an external electronic control system supplying the electrical signals proportional to the steering angle desired. Such a control system may be monitored and inputs generated by an external computer programmed with the logic required to achieve the steering beam angles desired Referring to FIG. 1 of the exemplary drawings, the present invention is embodied in a beam deflection apparatus that incorporates an array 2 of beam deflection elements 10 that deflect an incoming optical light beam 4 through an angle $\theta$ to produce an output beam 8. Optical beam deflection elements 10 serve to individually deflect a portion of a light beam impingent upon them through an angle proportional to a voltage applied across the element from driver electronics 16 located adjacent to the array 2 of elements 10. Driver electronics 16 control elements 10 which are arranged adjacent one another in rows 22 to form a two dimensional array 2. External control electronics 12 serve to supply control signals to drive electronics 16 through cable 14 to coordinate and control the deflection of beam 8. An external computer 18 may monitor and send commands to control electronics 12 through cable 20 to command beam steering angles. While FIG. 1 illustrates the steering of a light beam by transmissive refractive elements, the operation of such a system using reflective elements or combination of refractive and reflective elements is similar. Array 2 may be formed of two individual one dimensional arrays placed surface to surface or in near proximity with their rows arranged orthogonally to thereby provide a two dimensional steering capability.

Figure 2:
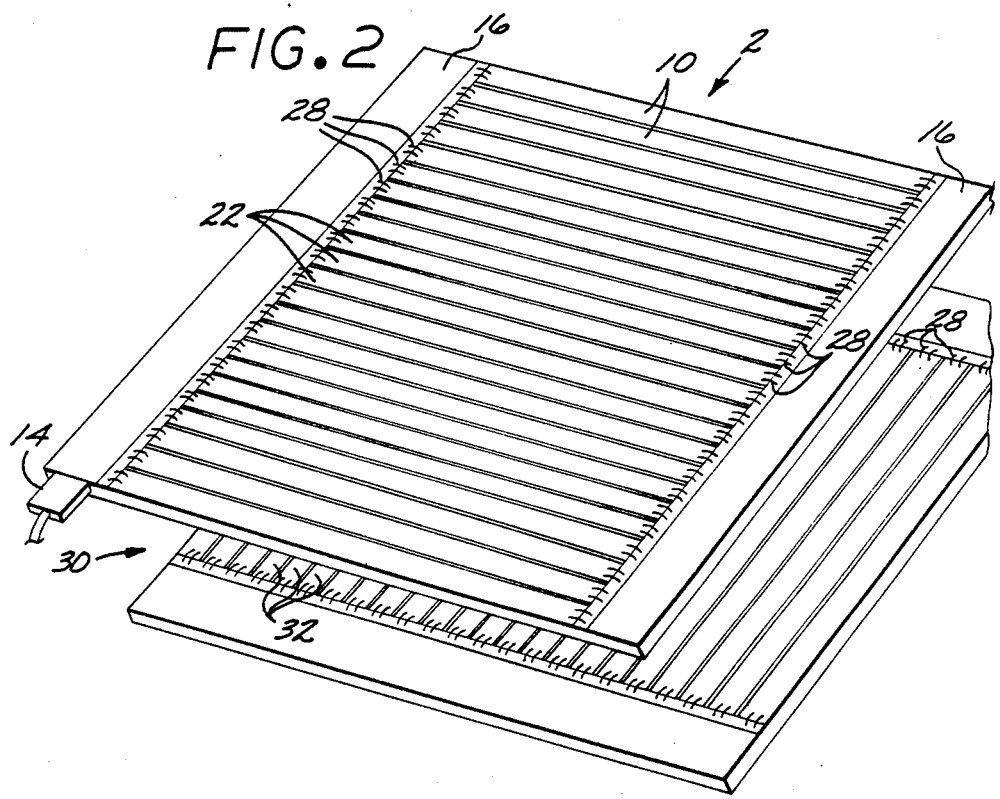
FIG. 2 is an exploded perspective drawing of the phased array of the present invention illustrating an embodiment in which two orthogonally oriented planar arrays are used to provide two dimensional beam steering.

FIG. 2 illustrates in somewhat more detail the optical array of the present invention. Array 2 is made up of lines 22 of array elements 10 that command a specific angle deflection of a segment of the impingent beam. Lines 22 are placed parallel and adjacent to each other to complete the array 2. Drive electronics 16 are located in the framework 26 adjacent the array. Cabling 28 connects the drive electronics 16 to lines 22 of elements 10 in the array. A second array 30 may be located in a coplanar position with first array 2. Second array 30 is arranged so that the lines 32 of array 30 are orthogonal to lines 22, thereby providing a means to deflect the beam in a direction perpendicular to that in which array 2 deflects a beam.

As discussed above, liquid crystal devices have several advantages over both conventional electro-optical scanners and mechanically scanned mirrors in a variety of optical systems applications. The large electrically variable anisotropy of liquid crystals may be used to generate optical phase shifts across neighboring regions of a coherent optical beam passing through the liquid crystal layer, resulting in a high density phased optical array that can be rapidly steered over a significant angular range.

Figure 3:
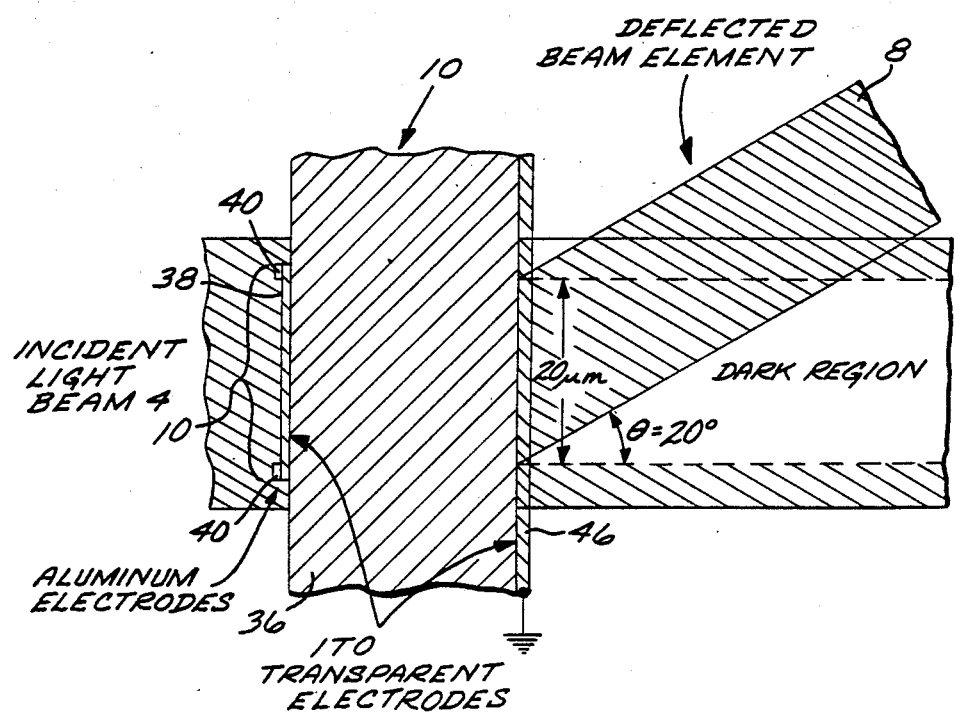
FIG. 3 is a cross section of a liquid crystal beam steering element of the type used in the present invention illustrating the relationship of the incident beam and deflected beam in the transmissive mode.

FIG. 3 is an illustration of a liquid crystal element 10 of the type used in the optical array 2 of the present invention, showing a local liquid crystal region 36 with visible wavelength transparent indium tin oxide (ITO) electrodes 38, 46 and aluminum driving electrodes 40. The optical path variation induced across the local region of the beam 4 can be as high as 2.5 $\mu$m (single beam pass) for a layer 36 thickness of 10 $\mu$m, producing the deflected beam 8. The actual path variation available in a given cell design is a function of wavelength and scan parameter design. The effective liquid crystal birefringence ($\Delta$n) depends on the applied voltage, and to a first approximation it varies linearly with the voltage. Therefore, the phase variation, $\Delta\theta$ across one cell will be $$\Delta\phi \sim \frac{t\Delta n}{\lambda} \sim \frac{t\Delta V}{\lambda} \sim \frac{t\Delta X}{\lambda}, \qquad (1)$$

where t is the liquid crystal thickness and X is the coordinate along the cell.

By constructing a liquid crystal device with many adjacent electrically adjustable optical phase shifters, it is possible to steer an optical beam through a relatively large angle (e.g., $\pm 20°$) without incurring severe loss in the beam power. Combining several liquid crystal devices with a mirror 42 causes the optical phase shift induced by each layer to be doubled on reflection. The electrodes for each layer can then be arrayed as discussed above to deflect the beam in a specific plane to produce an orthogonal two-axis deflection system. For applications at infrared (IR) wavelengths specific transparent conducting materials (TCM) can be selected to perform the functions of the ITO layers.

The basic liquid crystal (LC) phased array beam steering system of the present invention incorporates several types of blazed phased array scanners. The active LC regions are thin flat layers (2 to 20 μm) contained between flat partially conductive transparent strip electrodes (such as ITO) driven by long, relatively thin and narrow aluminum electrodes. The term "blazed" refers to the slopes of the optical wavefronts exiting the liquid crystal regions. The blazed phased array offers the advantages of high diffraction efficiency at large scan angles, and relatively larger electrical circuit element feature sizes, compared to other approaches. For many applications, the existing liquid crystal response times lead to satisfactory beam deflection times. At longer wavelengths or where maximum response speeds are required, a "flat" phased array scanner analogous to the so called "piston" beam deflector may be a preferred embodiment of the present invention. Such a "flat" phased array can produce given delection angles within a thinner liquid crystal layer than the blazed type, which in turn leads to a faster device response time. Combinations of these techniques may be useful for certain applications, and this combination can be accomplished by connecting the electrodes 40 together in each cell 10 and driving each cell with an appropriate voltage to generate a specific beam deflection and phase.

Figure 4:
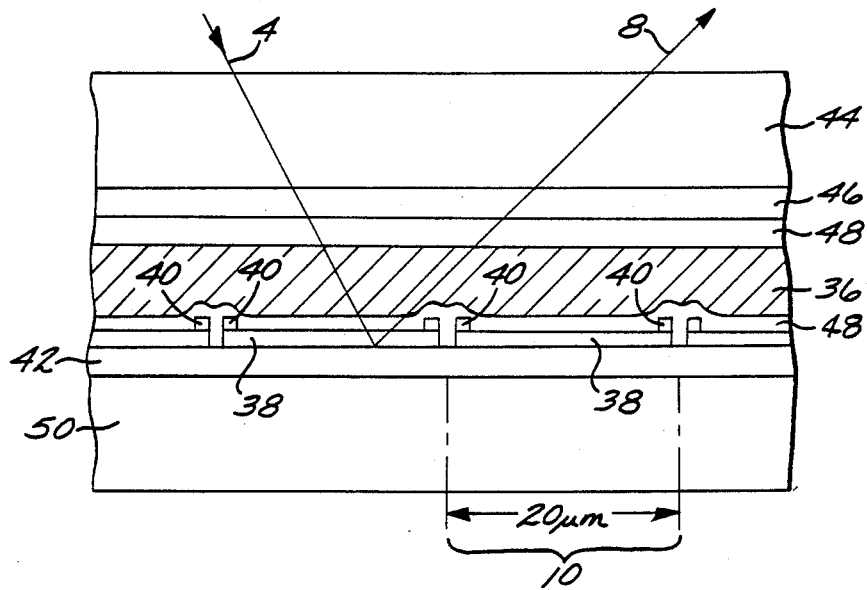
FIG. 4 is a cross sectional view of a liquid crystal beam deflector element of the type used in the planar array of the invention.

FIG. 4 illustrates the general concept of a blazed phase grating liquid crystal beam steering array 2 of the type that may be used in the present invention. The ITO layers 38, 46 (ITO is used here as a typical transparent electrode material) are optically transparent conductors that apply the bias voltages to the liquid crystal layer 36. The elements 40 on top of the ITO 38, 46 are aluminum busbars that are addressed by drive electronics 16 (not shown) to produce a voltage gradient across the ITO layers 38, 46, which in turn generates a linear voltage gradient across the liquid crystal region 36 of the device. The remainder of an LC cell construction appropriate for the present invention would include a flat cover substrate 44 made of glass, Silicon, Germanium or other suitable optical material, a layer of ITO 46 and layers of Silicon Dioxide (Si $O_2$) 48 adjacent to liquid crystal layer 36. A flat substrate 50 provides a solid mounting base for cell element 10.

Figure 5:
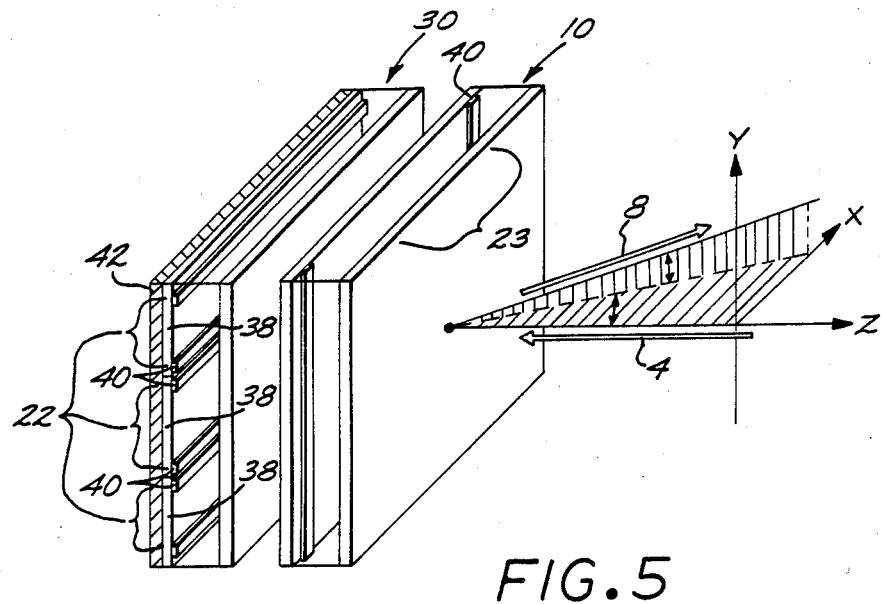
FIG. 5 is perspective exploded view illustrating the relationship between the two layers of the beam deflection arrays of FIG. 2 and the resultant two dimensional beam deflection possible by the use of such an array.

FIG. 5 is an illustration of the arrangement of two cascaded LC deflection arrays 2, and 30 with a reflector 42, thereby providing that the incident light beam wave 4 travels twice through each refracting medium, thereby inducing twice the phase shift that each cell produces. By arranging the electrode 40 geometries orthogonally in arrays 2 and 30, the beam 4 may be steered in two dimensions by appropriate choice of drive voltages for the combining of electrodes 22 & 23.

Figure 6:
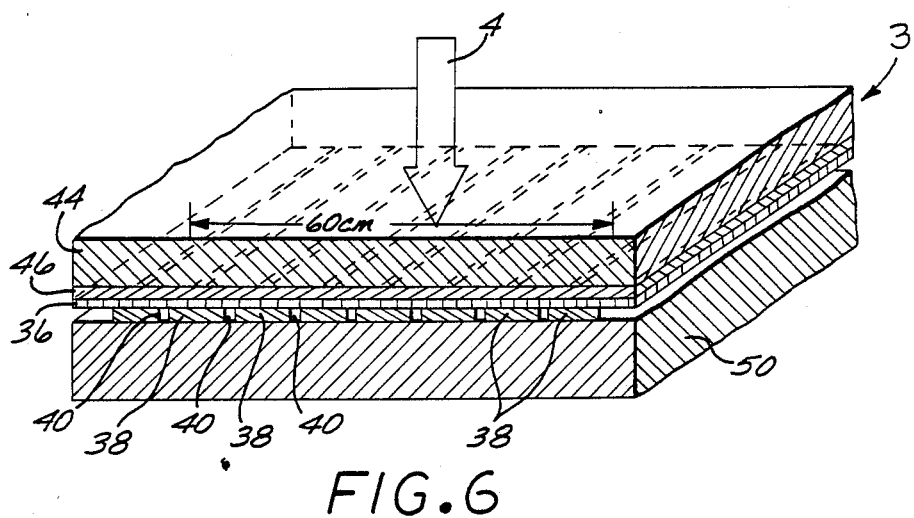
FIG. 6 is a phantom perspective view of a portion of a liquid crystal panel array of the type used in the present invention, illustrating the relationship between the various components of the array and the incident light beam.

FIG. 6 illustrates the construction of a single axis flat grating beam deflector 3 according to the invention. The ITO strip electrodes 38 are individually electrically driven to generate the optical phase shift required at each element to steer the beam in a specific direction. Aluminum electrodes 40 are driven by drive electronics 16 (not shown) to produce a voltage gradient across ITO layer 38 & 46, which in turn generates a linear voltage gradient across to liquid crystal region 36. Analogous to microwave phased array antennas, the element pattern determines the scan range of the array, and the larger the element size, the smaller the scan range. When the element size is made very small to increase the scan angle range, the number of elements increases and the number of electrical drive circuits increases. For example, at visible wavelengths, a 10- μm element size can generate ±35° of scan, while a 2- μm element size yields 18° scan. For a 50-cm array the 2- μm element size requires 250,000 drive signals. By comparison, this same system operating with 10 μm wide elements at 10-μm wavelength can scan ±60° using 50,000 drive signals.

The remainder of the construction of the LC array 3 is similar to that of FIG. 3 in that the cover 44 is made of a transparent material at the wavelength of interest and an ITO layer 46 is located between the cover and the LC layer 36. In this exemplary cell, which operates in a transmission mode rather than the reflection mode of the cell illustrated in FIG. 3, a transparent base substrate 50 is used.

Figure 7:
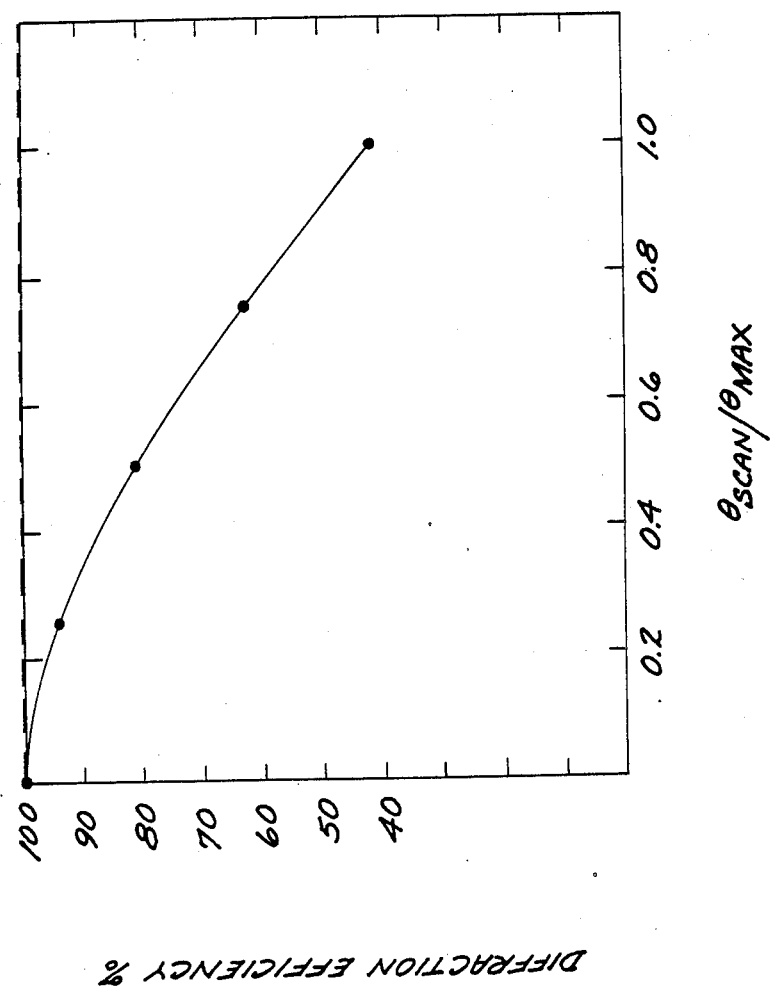
FIG. 7 is an illustration of the diffraction efficiencies as a function of scan angle for the flat or piston type of phased array and the idealized blazed phased array.

FIG. 7 shows curves illustrating the results of a calculation of the relative ideal diffraction efficiencies of the blazed phased array and the flat phased array as functions of the scan angle. This calculation is based on the relationship between the scan angle commanded and the maximum scan angle of which the array is capable. Obviously, the blazed array becomes more efficient for large scan angles due to the ability to vary the refractive index across the cell for large scan angles. The improved diffraction efficiency of the blazed approach at large scan angles compared to the "flat" scanner array approach is illustrated by these curves.

The present invention may be alternatively configured as a combination of the phased array and the blazed element methods in an optical beam steering array. This approach is discussed in more detail below and illustrated in FIGS. 19a and 19b. Such a system can be readily constructed to be both faster than the pure blazed array approach and have appreciably improved diffraction efficiency compared to the purely flat or "phased array" approach. At the same time the construction is appreciably simplified since no inter-element insulating gaps are employed. Such a system provides large deflection angles, employing only small phase retardations per element, and at the same time provides a high deflected beam efficiency, compared to the flat or phased array approach.

With each of the approaches discussed here, large diameter beams can be steered -without mechanical movement by employing large area liquid crystal cells operating with anisotropic refractive index effects; these are all very efficient compared to other schemes that employ weak index gratings and electro-optic refractive index effects.

Flat Grating Array

Figure 8:
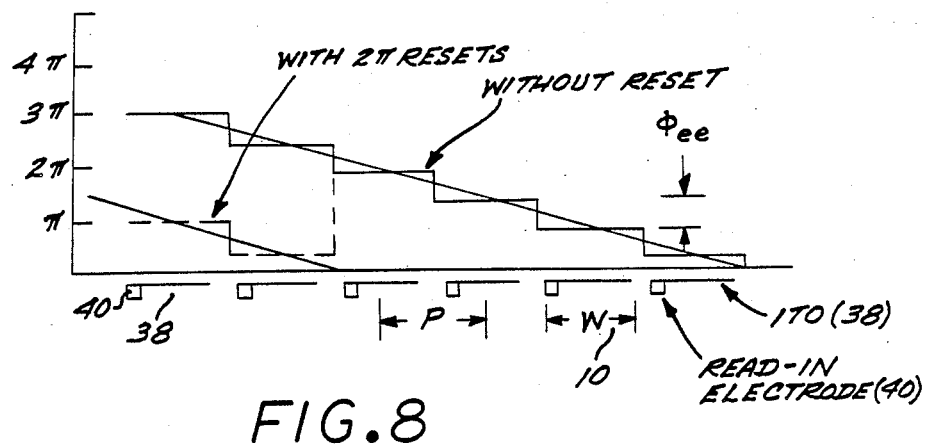
FIG. 8 is an illustration of a flat or piston grating system phase shift distribution for general scan angle conditions.

FIG. 8 illustrates the simplest form of a liquid crystal (LC) grating of the alternative "flat" or "piston" embodiment of the invention. In this implementation, the desired scanning operation is achieved by introducing programmable, step-like phase shifts. The phase shift steps θee are of width W and their center-to-center spacing, P, defines the basic period of the underlying line 10 electrode structure. As discussed above, the electrode structure and its associated LC control area constitutes an array line element 10. Each element 10 incorporates a single read-in strip electrode 40 of high conductivity metal, such as aluminum, since the resistance of the ITO strips 38 is too great to permit a fast signal read-in via the ITO itself. As previously illustrated in FIGS. 1, 3 and 4, the driver strip electrodes 40 are actuated by the drive electronics 16 located in the frames 26 & 30 of the array 2, to produce phase distributions according to the scheme depicted in FIGS. 8 and 9. Such flat grating arrays are the optical analogs of (one-dimensional) microwave phased arrays, and in adaptive optics terms would be called piston "mirror" adaptive optic systems. The present invention incorporates the special case where the array phase shift is step-wise linear and equal to $\pi$, with periodic resets, modulo $2\pi$, as illustrated by the dashed lines in FIGS. 8 and 9. This special case of maximum scan angle illustrated in FIG. 9.

If the progressive phase shift, from element to element, is defined as $\phi_{ee}$ this phase shift essentially determines the beam scan angle, $\theta_{scan}$, according to the relation $$\theta_{scan} \approx (\phi_{ee}/2\pi)(\lambda/P) \quad (2)$$

Values of $\phi_{ee}$ less than $\pi$ may be used to improve array time response efficiency. From Eq. (2), the maximum scan angle becomes $$(\theta_{scan})_{max} \approx \frac{\pi}{kP} = (\lambda/2P) \quad (3)$$

Figure 9:
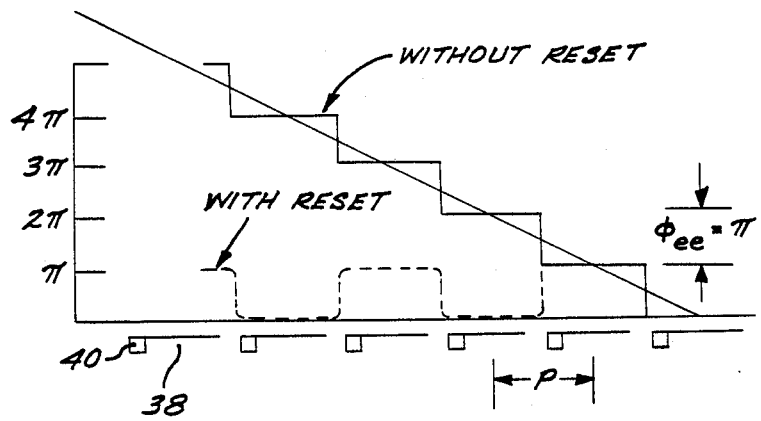
FIG. 9 is an illustration of the flat or piston grating system of the present invention under maximum scan angle conditions.

The phase shift distributions required to produce the maximum scan angle conditions of which the array is capable are illustrated in FIG. 9. At the maximum scan angle, equal powers are diffracted in the $\pm$ diffraction orders, and the beam power at the edges of the scan is reduced to approximately 41% of the power in the on-axis state. As previously shown in FIG. 7, ideal diffraction efficiencies at lesser scan angles are higher, but still do not approach the efficiencies of the ideal blazed phased array alternative implementation of the present invention. In practical implementations, area losses associated with the read-in electrodes also figure prominently in reducing diffraction efficiency.

Liquid Crystal Temporal Response Comparisons

Figure 10:
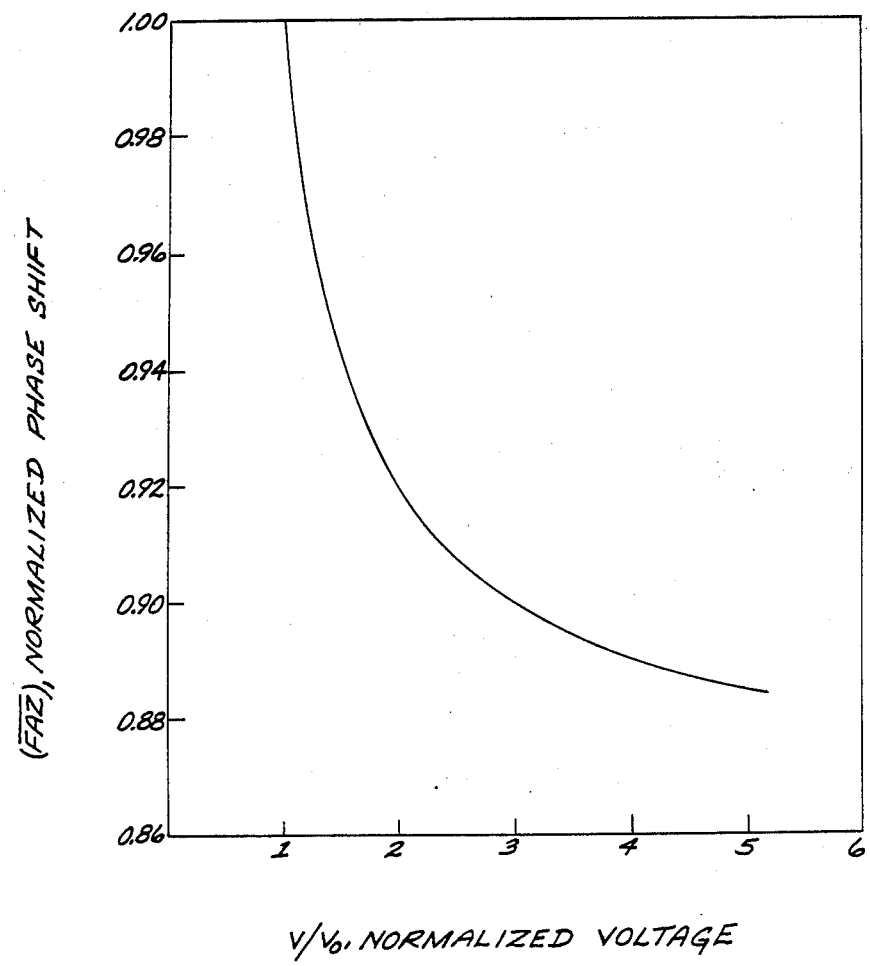
FIG. 10 is an illustration of the theoretical, normalized, double pass phase shifts of an array according to the invention as a function of the normalized voltage applied to a liquid crystal strip in the array.

FIG. 10 illustrates the normalized temporal responses plotted as a function of normalized driver voltage for the deflector elements of the present invention. This relationship is defined by the equation:

$$\Delta \phi = \frac{2Kn_{11}d}{1.75} (FAZ)$$

where $\Delta\phi$=phase shift, d=LC thickness, K=a constant for a given LC, N=Number & passes FAZ=Normalized phase shift.

The response is appreciably faster at the higher drive voltages which, as shown in FIG. 10, correspond to smaller phase changes. The equations associated with the curve of FIG. 10 show that the temporal response, for a given LC material, depends on the square of the LC thickness, d, which, in turn, is nearly proportional to the required dynamic range; that range which remains to be accommodated after the $2\pi$ resets. Since the reset process works differently in the "flat" and "blazed" systems, the required dynamic range is not the same for the two classes of system, even if the element-to-element phase shift is the same. The minimum phase-shift dynamic range required for the ideal blazed array is always larger than for the flat array and, with large element-to-element phase shifts it may be substantially larger.

The consequences of increased LC layer thickness is slower response as illustrated by FIG. 10. Specifically, if we assume the thickness is proportional to the phase shift, and if we take the temporal response to increase with the square of the thickness, then it may be seen that the ratio of the temporal response of the ideal blazed system to that of the flat system is given as $$T_{blaze}/T_{flat} = \left[\frac{\phi ee + 2\pi}{2\pi}\right]^2$$

Liquid Crystal Alignment Birefringence And Linearity

The liquid crystal configurations which are most appropriate to this device are the parallel alignment nematic liquid crystal arrays in which the liquid crystal molecules are, in the absence of electric fields aligned nearly parallel with the incident beam polarization direction.

A specific liquid crystal, BDH-E7, evaluated for the invention, has exhibited a birefringence change of 0.2 for a 7-Volt change in the voltage applied across the LC layer. This birefringence change is nearly independent of thickness in the 1.5-to-20-$\mu$m range and is consistent with the requirements for the beam deflector elements described above.

Figure 11:
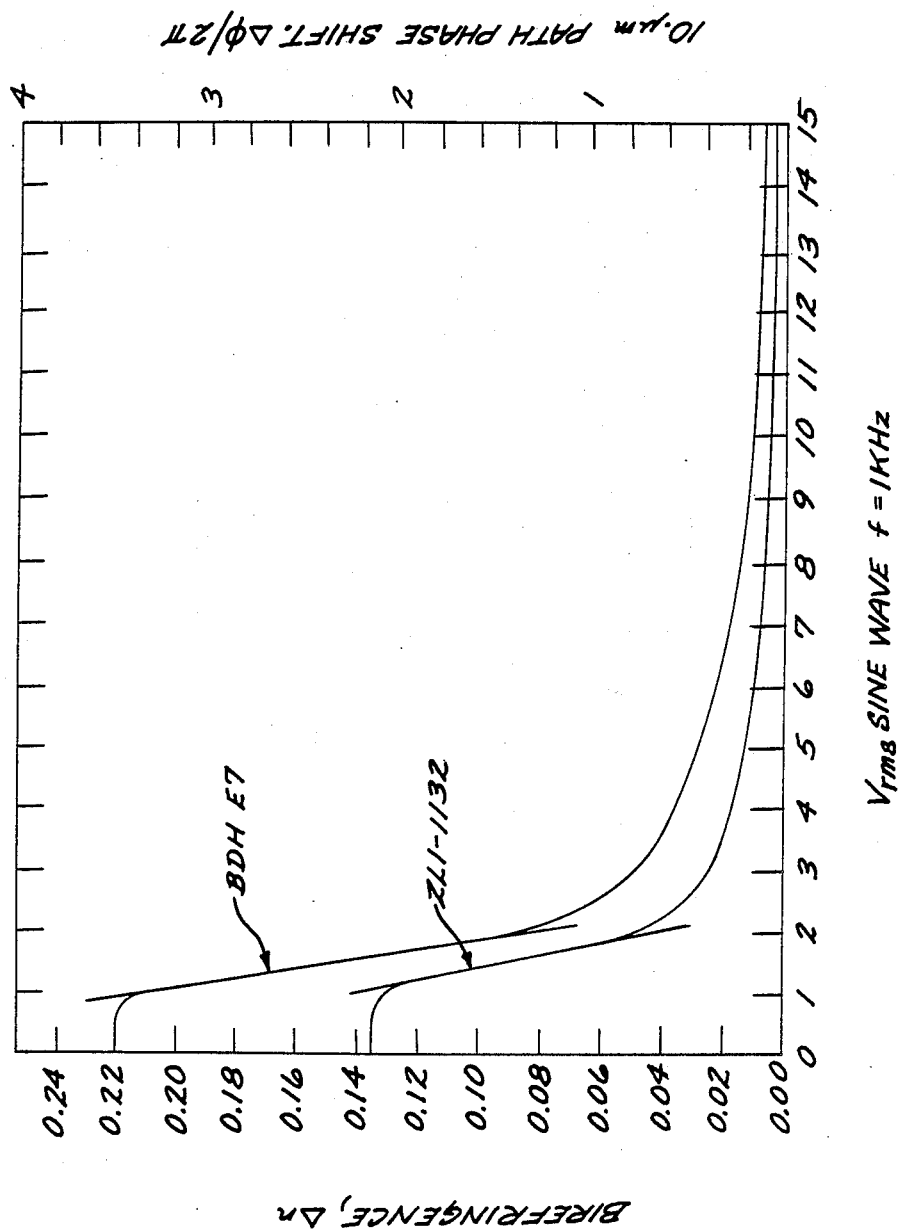
FIG. 11 is an illustration of birefringence and path phase shift as a function of voltage applied to a typical liquid crystal cell of the type used in the present invention.

FIG. 11 illustrates that the liquid crystal birefringence index change generated by varying the electric field (Vrms) across the LC layer is not linearly proportional to the electric field over its entire operating range for the BDH-E7 crystal. The concomitant phase shift at 0.6328 $\mu$m in a 10-$\mu$m thick liquid crystal layer is plotted on the right ordinate of FIG. 11. Thus, and in general terms, if the voltage gradients applied across the segments of the LC beam steering device cover this entire voltage range, then the phase shift across the segment will not be a linear function of position on the crystal. However, if the voltage applied to a BDH-E7 crystal is confined to the linear phase shift regime (approximately 0.635 to 1.651 V), then the phase shift gradient in any segment will be controlled to between $1.4 \times 2\pi$ and $3.4 \times 2\pi$, or to more than $2 \times 2\pi$. For minimum response time with the blazed phased array scheme, the phase slope across any segment must be less than or equal to $2\pi$, and the phase offset at one edge of each segment must be less than or equal to $2\pi$. From the above, it can be seen that the phase shift requirements of the array of the present invention can be met using the linear slope region of the liquid crystal. This feature is extremely important because it allows the phase shift to be a linear function of position across the array which minimizes the losses of energy diffracted into non-useful directions. This result is also valid for thicker liquid crystal layers at this wavelength because the phase shift is larger but still linear. If the layer thickness decreases or the wavelength increases, the linear phase shift range may become smaller than $2 \times 2\pi$. In this case the driving voltages in some of the elements may make a temporary excursion into the nonlinear region, causing slight degradation of the optical efficiency.

At longer wavelengths and large scan angles large voltage excursions are needed to obtain the required phase shifts. However, the phase shift produced by a liquid crystal layer is not a precisely linear function of the applied voltage as illustrated in FIG. 11. Further, it is not possible to simply linearize the transfer characteristic by restricting the voltage excursion to a very narrow range about some operating point, since this approach requires thicker LC layers to achieve the required dynamic range and relatively slow response speeds would result. Thus, under conditions normally encountered at large scan angles the phase shift slope will depart from the idealized linear regions, and there will be an associated loss in diffraction efficiency.

Liquid Crystal Optical Transmission Efficiency

Figure 12:
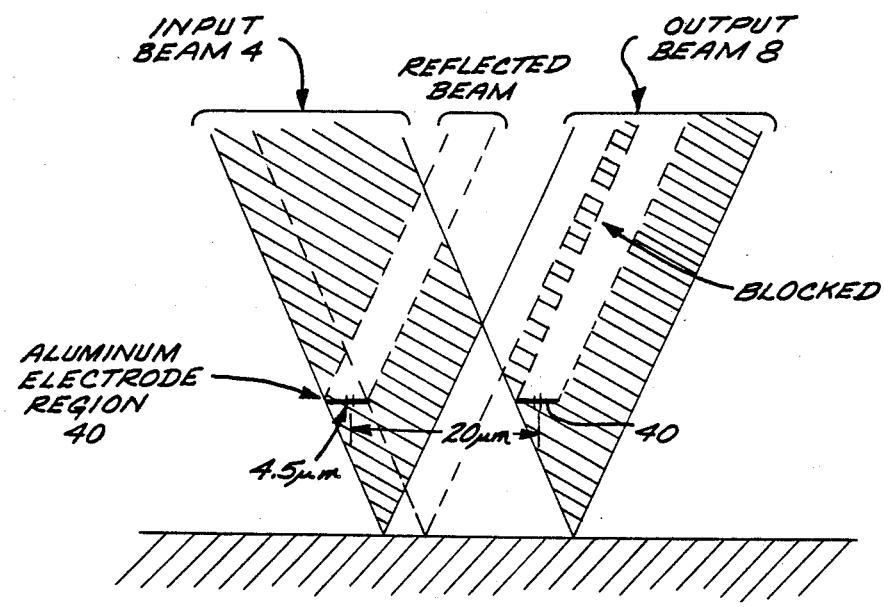
FIG. 12 is a diagram of beam obscuration by the electrodes in liquid crystal cells for the beam deflectors of the present invention.

FIG. 12 illustrates the construction of a portion of a liquid crystal beam steering cell for the purpose of showing blocking by electrodes 40. This structure contains pairs of aluminum strips 40 each 1.5 μm wide separated by a 1.5-μm gap in an array with 20- μm center-to-center spacing. This electrode arrangement reflects the energy incident on the 1.5-μ m-wide strips and improperly phases the energy incident on the 1.0-μm spaces, causing a net transmission loss in the system. This loss is approximately 20% for these array dimensions. Many of the parameters such as time response, efficiency, maximum deflection angle, beam size, and number of electrodes are interrelated, and a wide variety of tradeoffs can be analyzed to optimize the array parameters. For example, if the array is expanded to 40-μm spacing, the loss is reduced to 10%, but the increased liquid crystal thickness results in a loss in response time, thus slowing the beam rotation speed.

An inverse relationship exists between beam steering time and optical efficiency for a specific maximum scan angle. If the scan angle requirements are reduced, the scanning array segment width can be increased, at the same film thickness, to obtain higher optical efficiency at the same steering rate. Techniques for making multiple optical beam passes through the beam steering cell can, in theory, increase the angular deflection, but the transmission efficiency is degraded with each pass. Thus a double pass through a single cell will reduce the efficiency from 80% to 64%.

For two cascaded (20 μm array spacing) optical cells, each capable of steering the beam in orthogonal directions, the expected efficiency is thus 64%, if the beam passes through two cells in close proximity to each other and to a reflector that doubles the optical phase shift and the deflector angle. If the liquid crystal layer is relatively thick or if the cells are far apart, the dead zone created by the aluminum electrodes effectively masks the beam a second time and reduces the efficiency.

The Blazed Phased Array

Figure 13:
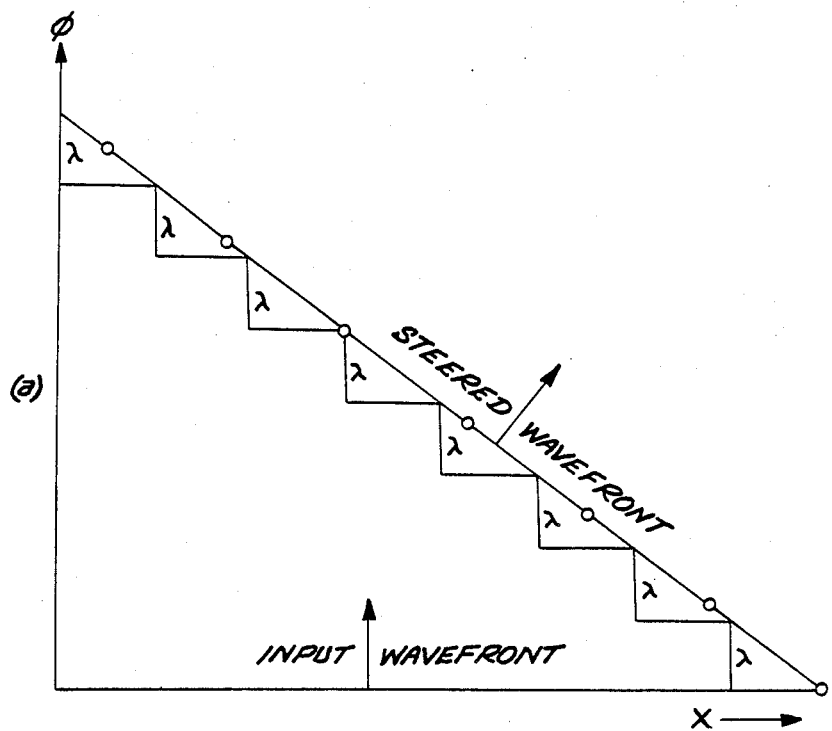
FIG. 13 is an illustration of the blazed phased array beam steering scheme for an ideal wavefront.

One alternative means of steering an optical beam initially propagating in a specific direction to a new direction in space, is to produce a linear phase shift along the wavefront of the beam at a specific location. FIG. 13 illustrates the geometry associated with such wavefront phase shifts. The vertical distance at each point of the steered wavefront represents an optical phase shift, calculated on the basis of the ratio of this distance to the optical wavelength. In the exaggerated example of the beam steering concept shown in FIG. 12, an optical wavelength is stepped off along the steered wavefront. Each of these wavelength steps, representing an optical phase shift of 360°, (or our wavelength, λ) can be removed from the planar wavefront without affecting the characteristics of the steered beam, since they represent a given number of wavelengths and phase coherence can therefore be maintained. In the beam steering device of the present invention, these steps can consist of many wavelengths λ.

Figure 14:
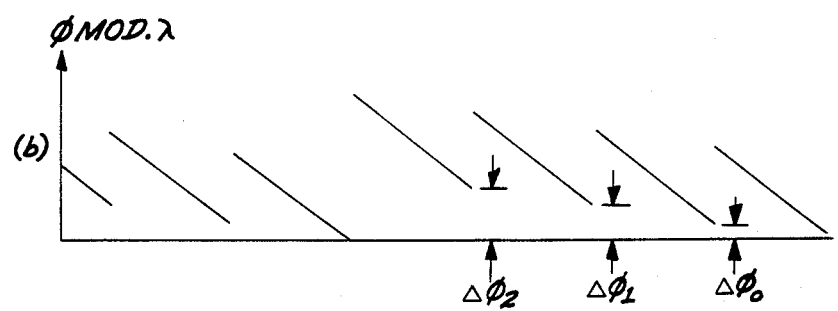
FIG. 14 is an illustration of the array of steered elements of the present invention with modulo $2\pi$ excess phase removal for each element.

More particularly, if the uniformly spaced linear array of FIG. 12 is considered, and if the wavelength steps, λ or modulo 360° (2π radians) phase shifts represented by the regions between the dots are removed from the regions between these elements, the modified phase profile of the beam steering array takes approximately the form shown in FIG. 13. The phase profile shown in FIG. 14 can be made exactly equivalent to the profile shown in FIG. 13 if a maximum integral number of wavelengths λ is removed from the phase at the right extent of the element, leaving a residual phase of less than 2π to correlate with the phase at the abutting end of the previous element as shown by the quantities $\Delta\phi_1$, $\Delta\phi_2$, $\Delta\phi_3$, etc. in FIG. 14. Using this scheme the phase "jump" between two abutting end points of two adjacent elements is always an integral number of wavelengths. It can be seen that implementation of the beam steering system of the present invention requires precise calculation and electronic generation of the same phase slope for all of the elements and a different endpoint phase for each element in the beam steering array.

FIG. 15 illustrates the device geometry used in conjunction with the stepped-phased-array scheme of the present invention to generate a steered optical beam. The adjacent end electrodes 40 from the neighboring array elements 10 are provided with a finite gap for electrical isolation. The voltages applied to the electrodes produce phase modulations similar to those shown in FIG. 15a and described above. The regions with a common slope represent the elements altering the wavefront in the desired direction, while the regions with the steeper phase fronts, corresponding to the gap between the aluminum conductors 40, represent the energy deflected away from the desired direction. This misdirected energy, in addition to the blocked energy described above, determines the transmission loss of the apparatus of the present invention. This loss factor, in turn, is proportional to the ratio of the width of the aluminum strips 40 and their gap relative to the array spacing.

Beam Steering Calculations

The optical phase shift induced in a wave passing through a liquid crystal layer is $$\Delta\phi = \frac{2\pi N d}{\lambda} \tag{5}$$

where d is the layer thickness, N is the refractive index, and λ is the wavelength. The optical anisotropy of the liquid crystal, and the ability to rotate its molecules by an applied voltage, makes it possible to vary the refractive index continuously over the range from the ordinary index to the extraordinary index. The refractive index change is the parameter of significance in this beam steering application, and it can be electrically varied over the range from 0 to 0.25 from most wavelength ranges of interest.

FIG. 15a shows the relationship between the steered (as by an ordinary mirror) wavefront at angle and the incident wavefront. The removal of the multiple wavelength steps, which represent multiple 360° phase shifts, enables large steering angles to be achieved with only small phase retardation in the array. Matching of the phases (up to an integral number of wavelengths) at the end of the elements and generating the blaze (slope) within the elements, results in high beam efficiency.

The phase profile resulting from this operation is shown in FIG. 15b. This phase profile has the appearance of an altered Fresnel zone plate. The segments of the phase profile all have the same slope and the same width, but their initial values or bias levels are all different. As discussed above, the difference between the phase at the end of one segment and the beginning of the next will be an integral multiple of 360° or 0°, depending on the array spacing and the steering angle α. The initial value of the phase in each segment will be Δφ1, Δφ2, Δφ3, . . . Δφn.

FIG. 16 illustrates the basis for a general calculation of the phase offset for each element in the array. The phase function for the first element of the array is given by $$\phi(x) = 2\pi[x\tan(\alpha)]/(\lambda), \quad (6)$$

where x is the horizontal position across the beam segment, is the beam steering angle, and λ is the wavelength. If the width of each segment is w, and K(n) is the integer representing the number of wavelengths to be subtracted from the $n^{th}$ segment, then the phase offset, δφ(n) at the right edge of the $n^{th}$ segment is given by $$\delta\phi(0) = 0 \quad \text{7(a)}$$
$$\delta\phi(1) = 2\pi[w\tan(\alpha) - K(1)\lambda]/\lambda \quad \text{7(b)}$$
$$\delta\phi(2) = 2\pi[2w\tan(\alpha) - K(2)\lambda]/\lambda \quad \text{7(c)}$$
$$\delta\phi(3) = 2\pi[3w\tan(\alpha) - K(3)\lambda]/\lambda \quad \text{7(d)}$$
$$\vdots$$
$$\delta\phi(n) = 2\pi[nw\tan(\alpha) - K(n)\lambda]/\lambda, \quad \text{7(n)}$$

where K(n) is defined by $$([nw\tan(\alpha)/\lambda] - 1) \leq K(n) \leq (nw\tan(\alpha)/\lambda). \quad (8)$$

In the negative x direction, the phase at the right edge of the $n^{th}$ segment of the array is given by $$\phi'(n) = \delta\phi(n). \quad \text{9(a)}$$

At the left edge of this segment, the phase is given by $$\phi''(n) = \delta\phi(n) + 2\pi(w\tan(\alpha))/\lambda \quad \text{9(b)}$$

Equations 8, 9a and 9b are used to calculate the phase distributions needed across the segments of the beam steering array to deflect the beam through angle α. Inserting Eq. 8 into Eq. 9a and 9b yields the final equations:

$$\phi1'(n) = 2\pi[nw\tan(\alpha) - K(n)\lambda]_\pi$$
$$\phi''(n) = 2\pi[(n+1)w\tan(\alpha) - K(n)\lambda]/\lambda.$$

Equations 10 and 10b can be numerically evaluated for a typical beam steering situation. For example, for a liquid crystal beam scanner operating at a wavelength of 0.6328 μm with segments 20 μm wide that deflect a beam through an angle of ±20°, the key parameters are w=20 μm, α=20°, λ=0.6328 μm, and wtan(α)/λ=11.503.

The phases for the first nine segments in the array, calculated from Eqs. 10a and 10b, are given in Table 1.

TABLE 1

| | Blazed Phased Array Calculations | | |
|---|---|---|---|
| n | K(n) | Φ'(n) | Φ''(n) |
| 0 | 0 | 0 | (11.503)2π |
| 1 | 11 | (0.503)2π | (12.006)2π |
| 2 | 23 | (0.007)2π | (11.510)2π |
| 3 | 34 | (0.510)2π | (12.014)2π |
| 4 | 46 | (0.014)2π | (11.517)2π |
| 5 | 57 | (0.517)2π | (12.020)2π |
| 6 | 69 | (0.021)2π | (11.524)2π |
| 7 | 80 | (0.524)2π | (12.027)2π |
| 8 | 92 | (0.028)2π | (11.531)2π |

It can be seen from the above that the phases are not integrally related. The phase change across each segment of the array is 11.503×360°, and the initial phase offset is less than 360° in each element, as required by the blazed approach.

The phase change across each segment of the array is generated by a change in the refractive index of the liquid crystal film, induced by varying the voltage across the film. The maximum change in the refractive index that can be generated is equal to the anisotropy Δn of the liquid crystal. For some liquid crystals, in the visible region, Δn can be approximately 0.25. The phase change Δφ induced in a film of thickness t by a refractive index change Δn at a specific wavelength λ is given by $$\Delta\phi = 360° (\Delta n t/\lambda). \quad (11)$$

Where the optical beam passes through the liquid crystal film, is reflected by a mirror, and passes back through the film, the phase shift is doubled and is given by $$\Delta\phi = 720° (\Delta n t/\lambda). \quad (12)$$

Assuming typical values for anisotropy of 0.2, a film ckness of 18.5 μm, and a wavelength of 0.6328 μm in Eq. 12 a phase shift of 11.7×360° is calculated. The beam deflection angle is simply the slope of the wavefront shown in FIG. 16. This slope is given by $$\tan(\alpha) = [2\Delta n t - \Delta\phi(n)\lambda/2\pi]/W, \quad (13)$$

where 2Δnt is the total retardation in micrometers in the liquid crystal, Δφ(n)λ/2π is the bias phase in micrometers, and W is the electrode spacing. Thus a multisegmented liquid crystal beam steering array with a film thickness of about 20 μm can steer an optical beam through an angle of ±20°. The voltage values in the array are transposed from right to left to alter the beam scan from +20° to −20°. Inverting the sign of the voltage in a given element will have no effect on the beam steering device because the liquid crystal rotation is proportional to the energy, or square of the voltage.

Liquid Crystal Reponse Time

The liquid crystal layer response time is important to the invention because it is a measure of the time that it takes to steer the beam and includes the rise time and the decay time. In the present invention the beam is deflected from one angle to another and as a result, the response time experienced will be either the rise time or the decay time, depending upon the initial deflection angle.

Recent measurements of liquid crystal light valve response times as a function of layer thickness indicate that the response time is approximately 17 ms for a 4-μm layer and 38 ms for a 6-μm layer for the BDH-E7 LC. At a fixed bias level, the response time is proportional to the square of the layer thickness. Thus, increasing the layer thickness from 6 to 12 μm should increase the response time from 38 to 152 ms, which corresponds to six beam pointing position changes per second.

Another important factor in the time response of the liquid crystal beam deflection system of the present invention is the unique blazed phase shift geometry developed for the invention, since it minimizes the film thickness required for a given deflection angle. If the beam is to be deflected from a specific negative angle to a positive angle of the same size, the voltages applied to the electrodes in one segment or element of the array are not reversed in polarity; rather the voltages in all of the elements in the array are interchanged symmetrically about the center of the array. Since this condition generally does not require the liquid crystal molecules to rotate change from maximum to zero values, the response times will be less than the maximum response times observed in the laboratory for a single cell.

Response times for different liquid crystal materials vary since they depend on the viscosity of the liquid crystal and the optical birefringence. Therefore, there are a variety of LC materials that may prove valuable for application to the present invention, depending on the light frequency, response time and deflection angle requirements.

Design Parameters For A Visible Wavelength Beam Deflector

A design of a preferred embodiment of a beam deflector array according to the present invention includes pairs of aluminum conductors 40 μ m thick and 1.5 μm wide, separated by a 1.0-μm gap in an array 20 μ m on centers, covering a panel 50 cm high by 50 cm wide. If the electrodes are driven symmetrically from both ends, the effective length of each aluminum strip can be 25 cm. The resistance of the 1.0- μm aluminum film is therefore 0.05 Ω/sq and the resistance of the aluminum electrode is 8300Ω. The resistance of the liquid crystal stripe 250,000 μm long by 20 μm wide by 4 μm thick is 200 MΩ, if the liquid crystal resistivity is 1000 MΩ-cm, a typical value. The transparent conductor material (TCM) sheet resistivity is a function of its thickness. The TCM layers used in the invention must be optically transparent at the operating wavelength and must possess a specific range of resistivity values suitable for each design. Examples of typical TCM materials include thin film ITO, doped $SiO_2$, and organic polymers. Assuming a TCM resistivity of $10^9$ Ω/sq for the 20 by 250,000-μm area, the TCM resistance from side to side is 80,000Ω. These electrical design parameters are all physically realizable and they are close to values in currently available devices. This design results in $R_{LC} > > R_{TCM} > > R_{AL}$, where $R_{LC}$ is the liquid crystal layer resistance, $R_{TCM}$ is the TCM layer resistance, and $R_{AL}$ is the aluminum strip resistance. Thus the TCM layer does not load the aluminum wires, and the liquid crystal does not load the TCM layer.

The capacitance of a 4.0- μm-thick by 20- μm wide by 250,000- μm-long liquid crystal layer is 56 pF, and the resistance of the TCM electrode is 800,000Ω. The electrical time constant of the beam steering circuit segment is therefore 4.5 μs, and since this is much faster than the liquid crystal response time, the beam steering speed will be limited only by the liquid crystal response time.

The electrical power dissipation in this embodiment is determined by the electrical resistance of the TCM layer and the voltage applied to the liquid crystal layer. Assuming 6 V across the layer, 80,000Ω resistance per segment, and 25,000 segments, the total power dissipation is about 11 W per steering panel.

The electrical parameters for a visible light beam deflector according to this invention are summarized in Table 2. The parameter ranges permit beam scanning over angular ranges as large as 40° with response times as long as 150 ms; or over angular ranges of a few degrees with response times of the order of 10 ms.

TABLE 2

| Visible Beam Scanner Parameters | |
|---|---|
| Panel size | 50 cm × 50 cm |
| Electrode pairs | on 20 μm centers |
| LC thickness | 4 μm to 20 μm |
| Al electrode stripes | 1.5 μm wide, 2 μm thick |
| Gap between Al stripes | 1.0 μm |
| Segment resistance | 80,000Ω |
| Segment capacitance | 56 pF |
| Segment time constant | 4.5 μs |
| Maximum scan voltage | 6 V |
| Total scanning power | 11 W |
| Scanning range | 0° to 40° |
| Response time | 10 ms to 150 ms |

Design Parameters for an Infrared Wavelength Beam Deflector

A beam deflector design according to the present invention operating at 10.6 μm wavelength will incorporate 1 μm thick conductors connected to transparent conducting material electrode layers 10 to 20 μm wide separated by 1 μm gaps. The power dissipation of this design will be 1/25 of the visible design discussed above because of the reduced surface area and the linear segment capacitance is reduced by a factor of 5. The segment resistance can be 40,000 to 80,000Ω, thus yielding an electrical time constant of the order of 1.25 μs. The device response time can therefore remain at 5 to 150 μs depending on scan angle range. Table 3 is a summary of the design parameters of a beam scanner according to the invention for a 10.6 μm beam.

TABLE 3

| Typical Beam Scanner Parameters at 10.6 μm | |
|---|---|
| Panel size | 10 cm × 1.0 cm |
| Electrode pairs | on 10 μm centers |
| LC thickness | 4 μm to 20 μm |
| Al electrode stripes | 1.5 μm wide, 1-2 μm thick |
| Gap between Al stripes | 1.0 μm |
| Segment resistance | 40,000Ω - 80,000Ω |
| Segment capacitance | 6 to 12 pF |
| Segment time constant | <1.25 μs |
| Maximum scan voltage | 6 V |
| Total scanning power | 1 W |
| Scanning range | ±20° |
| Response time | 5 ms to 150 ms |

Electronic Drivers and Interconnection

Drive electronics for the beam deflector array of the present invention must be capable of driving each electrode line with an analog signal since the LCs respond to analog voltage. The difference in voltage between adjacent lines determines the voltage that is applied to the liquid crystal and the liquid crystal responds to this voltage by producing an optical phase shift proportional to the voltage as described above.

Figure 17:
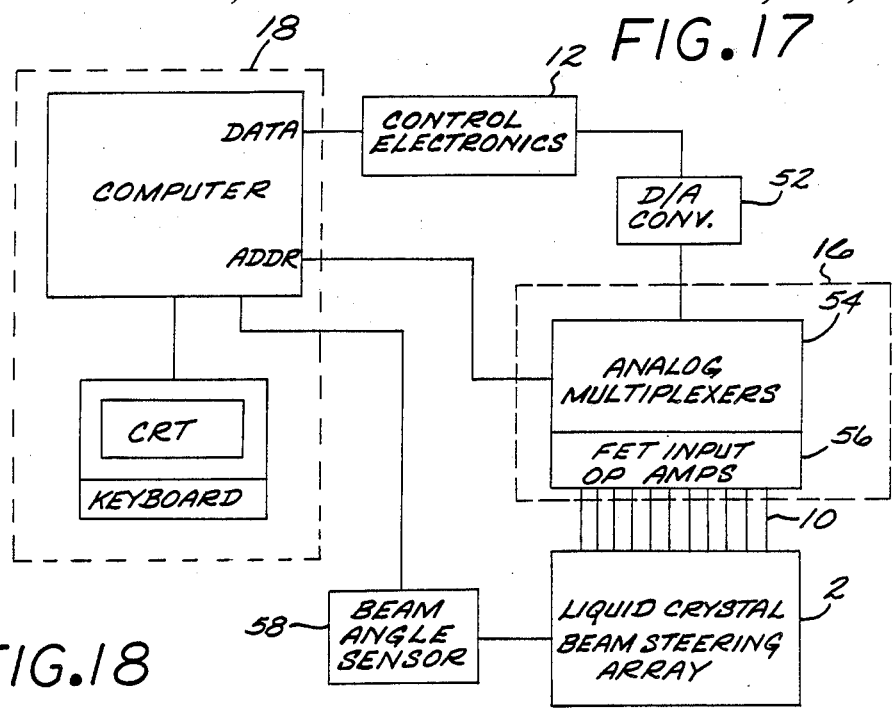
FIG. 17 is a block diagram of the various elements of the present invention illustrating the relationship between the beam steering array and its supporting subsystems.

In order for the beam to be steered with high accuracy and low scattering, the drive signals must be very accurate and stable and they should be able to be rapidly altered to move the beam position. The easiest and most versatile way to achieve this combination of speed and accuracy is by the use of a small computer, interfaced with an analog driver array, as a controller. FIG. 17 is a system block diagram illustrating the relationship between such a computer 18, control electronics 12, drive electroncs 16 and optical array 2 in the present invention. The computer 18 calculates the voltages required at each electrode, and is capable of setting up a data base in memory based upon data input by the operators and algorithms used to calculate the appropriate drive voltage to be supplied by drive electronics 16 for each beam deflector element 10. These data are based upon the LC characteristics and the array geometry as discussed above. The data are then sequentially sent to the control electronics 12, through the D/A converter 52 and the analog multiplexer 54 to each driver in drive electronics 16. The drivers are typically sample-and-hold amplifiers 56 that continuously maintain the correct voltage level on the output and have bandwidths adequate for the beam steering requirements of the array.

Computer 18 can be configured to monitor an external beam angle sensor 58 to control the beam direction. In response to the signal from the beam angle sensor 56, the voltages can be altered to deflect the beam to the desired location. A closed-loop feedback system can be configured as part of the electronic control system to allow the voltage settings to be calibrated against the actual beam position.

Figure 18:
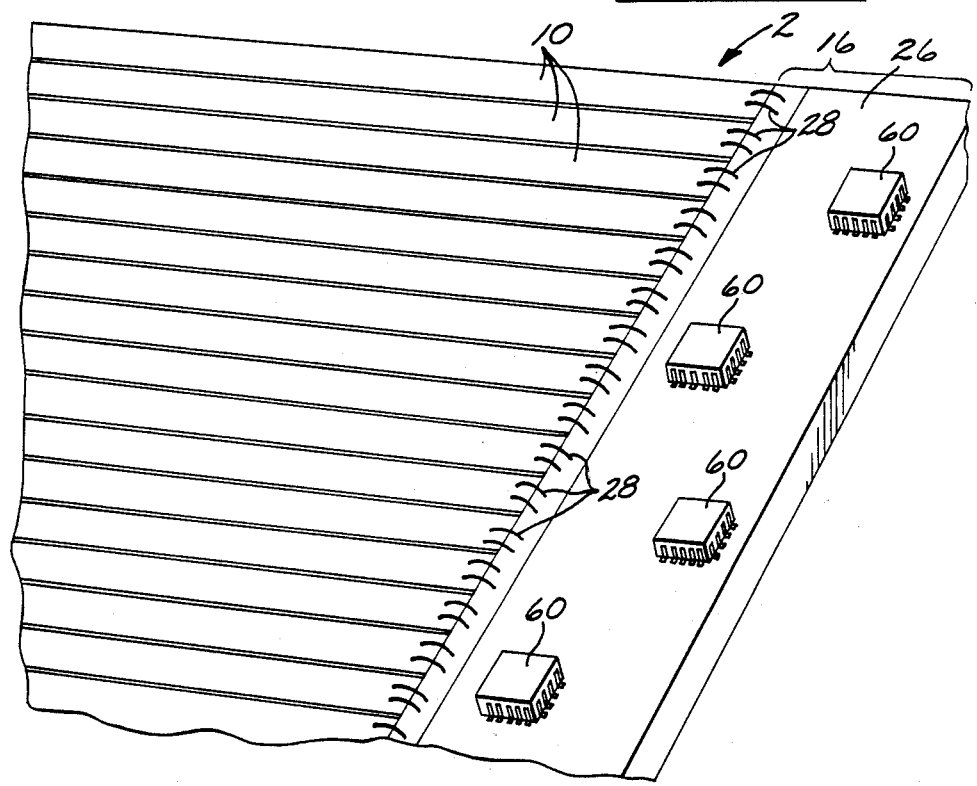
FIG. 18 is an illustration of a high density driver circuit packaging concept for the liquid crystal beam deflector array of the present invention.

As discussed above, an exemplary LC beam steering device of a preferred embodiment according to the invention can have an active region of approximately 50×50 cm. Since the width of each strip segment of the deflector can be approximately 20 μm, such a device would consist of 25,000 segments 10, each containing one pair of aluminum strip electrodes at opposite edges of the active area of the segment. Using conventional construction techniques, these electrode pairs can be merged into bundles with 3- μm center-to-center spacing to create space for mounting microcircuit driver chips. The center-to-center spacing between conductor pairs is now 6 μm, and the total width of the condensed conductor array is 25,000 times 6 μm, or 15 cm. This leaves 35 cm of space for 35 microcircuit chips and bonding pads in the first row. FIG. 18 illustrates the configuration of a phased array with this construction. Assuming that each chip has 200 electrodes on 8 mil centers (0.02 cm), or 50 electrodes on each side of the chip, the first row of driver chips 60 can drive 7000 of the 50,000 lines. If each succeeding row of driver chips drives 7000 more lines, then 50,000 lines can be driven by seven rows of drivers. The circuit routing geometry and the bonding pad layout of such an element can be done in a variety of ways of which the illustrated geometry is one of the preferred configurations. If there are 7 rows of driver chips 60 with 35 drivers in each row as discussed above, a total of 245 driver chips are required to control the entire array.

A benefit of the beam deflection device according to the present invention is that the voltages will be applied across very high impedance circuits, and consequently the power dissipation will be very low. These voltage drive levels are compatible with MOS-LSI circuits which are well within the capabilities of the current art.

Relationship Between The Blazed And Flat Phased Arrays

The fundamental difference between the Blazed Phased array implementation and the "flat" phased array implementation of the present invention is that, for the same element size the blazed concept requires two phase shifts lying between 0 and $2\pi$ radians per element, and the flat design requires only one. Assuming that the drive voltages are restricted to the linear region, this difference means that a liquid crystal layer twice as thick is used for the blazed array than for the flat array. The effect of a liquid crystal layer twice as thick is to increase the response time by a factor of 4. For visible wavelengths the time response of the thicker array is adequate for many applications. At longer wavelengths such as the infrared, the liquid crystal thickness becomes prohibitive for the blazed design, and the flat design becomes a more attractive candidate.

The blazed phase approach is more difficult to implement at longer wavelengths with rapid response times than the flat phased array because the small liquid crystal thickness required for the rapid response time forces the use of higher drive voltages to obtain the required phase shifts. The phase-versus-voltage characteristics thus moves out of the linear region, causing a nonlinear phase-versus-position in the array element, leading to beam degradation or loss and to loss of positioned accuracy. Under these conditions, the flat phased array approach offers an advantage in that the phase nonlinearity can be compensated by precisely adjusting the voltage drive for each element. Thus, a limitation of the flat phase grating approach is the loss of the intrinsic efficiency of the blazed approach at larger steering angles.

With a 10- μm element size, at a 10- μm wavelength, the flat array can theoretically be scanned through a ±26° angle (to the beam's half power points), if the liquid crystal layer is sufficiently thick. If this approach were attempted at visible wavelengths, the same ±26° angle scan would require an element size of 0.6 μm at a wavelength of 0.6 μm, which is beyond the current state of the art for high resolution photolithography, thus making the fabrication of such an array difficult, if not impossible, until improvements in photolithography are available. To compound the problems associated with such an approach, the array would require about 800,000 circuits, compared to 50,000 circuits for the blazed array approach for an active area as discussed above.

FIGS. 19a and 19b illustrate in schematic, wavefront representation, a third alternative implementation of the liquid crystal beam steering array of the present invention in which a combination of the blazed phase and the flat phase techniques are utilized in a single hybrid structure of the implementation previously described. In order to make the function of this implementation clearer, only the aluminum conductors 40 and the ITO strips 38 connecting them are shown. This approach avoids the requirement for element-to-element gaps in the structure. The solid sawtooth curve 62 represents the idealized phase shift and/or local wavelength directions (along with a linear-phase versus voltage-response is assumed), while the dashed curves 64 represent an idealized, fully-blazed grating for comparison purposes.

This system can be regarded as a blazed grating in which the $2\pi$ resets occur over a larger transverse dimension than in the fully-blazed system thereby providing an extended reset effect across the array.

FIG. 19a illustrates the phase state in the array which represents the maximum scan angle where equal powers are produced in the ± diffraction orders. FIG. 19b illustrates a lesser scan angle state that better approximates an ideal blazed grating. In all cases there are only two major diffracted orders and these are radiated in directions that are essentially normal to the wavefronts, as illustrated by the propagation arrows 66 on the Figures. The hybrid grating system can achieve double the scan angle for the same element period as the flat grating system, and is appropriate when high response speeds are required or when construction simplicity and a larger scan angle are required.

From the above it may be readily seen that the present invention represents an important and novel advance in the optical beam steering art. The LC arrays of this invention are capable of altering the angle of propagation of a large-diameter light beam impingent upon the array through relatively wide angles by small voltage changes, typically on the order of less than ten (10) volts applied to the array elements. By use of various types and geometries of blazed array configurations, a high degree of phase coherence and low scattering can be achieved, even at large deflection angles. When maximum speed of response is required or for operation at for longer wavelengths such as the infrared, either a hybrid blazed-flat phased array or flat phased array respectively may be used to provide the appropriate combination of speed and phase shift at some penalty in efficiency and optical quality compared to the blazed phased array.

While several particular forms of the invention have been illustrated and described, it will be apparent to those skilled in the art that various modifications can be made without departing from the spirit and scope of the invention. Accordingly, it is not intended that the invention be limited, except as by the appended claims.

We claim:
1. An optical beam steering system which comprises:
a plurality of liquid crystal beam deflection elements arranged in an array, said elements for independently deflecting through respective angles deflection, respective portions of an incident beam impingent upon each of said elements, wherein said array of beam deflection elements comprises:
(a) a first substrate;
(b) a plurality of transparent electrode strips on said first substrate for defining said plurality of beam deflection elements;
(c) at least two driver strip electrodes associated with each one of said plurality of electrode strips;
(d) a first insulating layer adjacent to said electrode strips and said driver strip electrodes;
(e) a liquid crystal layer adjacent to said first insulating layer;
(f) a second insulating layer on the opposite side of said liquid crystal layer from said first insulating layer;
(g) a transparent electrode layer adjacent to said second insulating layer, and
(h) a second substrate;
control means for independently controlling the respective angle of deflection and phase shift induced by each of said elements such that the phase jump between abutting end points of adjacent elements is an integral number of the wavelength of the incident beam, said control means comprising drive electronics for applying voltages across each of said elements so as to individually control said elements in response to external control signals, and
means for controlling said control means so as to steer said incident beam as a spatially phase coherent deflected beam through a steering angle relative to said incident beam, said deflected beam being composed of the portions deflected by said elements with spatial phase coherence with respect to each other.

2. The system of claim 1 further comprising:
at least two of said arrays, said arrays arranged with planes parallel to one another, so as to have a common axis perpendicular to the planes, said elements of said arrays being orthogonal for deflecting said incident beam in two dimensions relative to the common axis of said arrays.

3. The system of claim 1, wherein said means for controlling said control means comprises:
a computer operative to provide the control signals for controlling said drive electronics.

4. The system of claim 1 wherein said array further comprises:
a continuous reflector on a surface of said first substrate, between said first substrate and said plurality of electrode strips, opposite the surface upon which said incident beam is impingent to thereby increase the deflection angle for a given input control signal.

5. The system of claim 3 wherein said control means further comprises:
a plurality of digital to analog converter means to convert signals from said computer to voltages appropriate to drive said elements.

6. A beam steering apparatus which comprises:
a plurality of beam deflection elements, said elements arranged in an array of rows and columns, said elements for individually deflecting respective portions of an incident beam, each said element further comprising:
a first transparent resistive electrode strip on which the incident beam is incident;
a refractive layer positioned adjacent to said first electrode layer;
a second transparent electrode layer which is part of a continuous electrode layer common to all of said elements; and
two drive electrodes associated with said first electrode strip, said two drive electrodes having higher conductivity than said first electrode strip,
said elements arranged adjacent to each other so that there is a finite gap for electrical isolation between said electrode strips associated with adjacent said elements;
means for controlling said beam deflection elements in said rows in cooperation with one another, said means including means for applying drive voltages to said two drive electrodes associated with each said element to produce a voltage gradient across the respective refractive layer such that a linear phase shift is produced in the respective portion of said incident beam, said drive voltages having magnitudes suitable for inducing progressively varying phase shifts with periodic phase offsets so that each portion is steered, and the phase shifts between abutting end points of adjacent elements is an integral number of the wavelengths of the incident beam; and means for supplying signals to said means for controlling such that each steered portion is phase coherent with the other steered portions.

7. The apparatus of claim 6 further comprising:

reflection means for reflecting said incident beam back through said elements, positioned adjacent to said second transparent electrode layer.

8. The apparatus of claim 6 further comprising:

at least an additional array, said arrays arranged with their planes parallel to one another and their respective rows and columns perpendicular to one another to thereby allow steering of a beam incident upon said arrays in two dimensions.

9. The apparatus of claim 6 wherein said means for supplying signals to control said angle of deflection of said beam impingent upon said array further comprises:

a computer operative to calculate a control signal required for actuating each of said deflector elements in order to individually steer said impingent light beam so that the resultant steered beam has phase coherence.

10. The apparatus of claim 8 wherein each element of said additional array has only one driver strip electrode associated therewith, and each element of said array has two driver strip electrodes associated therewith.

* * * * *

UNITED STATES PATENT AND TRADEMARK OFFICE
CERTIFICATE OF CORRECTION

PATENT NO. : 4,937,539
DATED : JUNE 26, 1990
INVENTOR(S) : JAN GRINBERG, et al.

It is certified that error appears in the above-identified patent and that said Letters Patent is hereby corrected as shown below:

Col. 19, line 46, after the word "angle", insert --of--.

Col. 22, line 13, after the word "said", insert --linear--.

Signed and Sealed this

Nineteenth Day of October, 1993

Attest:

BRUCE LEHMAN

Attesting Officer         Commissioner of Patents and Trademarks